(12) United States Patent
Kuditipudi et al.

(10) Patent No.: US 7,391,720 B1
(45) Date of Patent: Jun. 24, 2008

(54) LOCAL SPAN MESH RESTORATION (LSMR)

(75) Inventors: Sivaramakrishna Kuditipudi, Sunnyvale, CA (US); Lei Fu, San Jose, CA (US); Premal D. Desai, San Jose, CA (US); Neeraj Gulati, Cupertino, CA (US); John S. Brenneman, Menlo Park, CA (US)

(73) Assignee: Ciena Corporation, Linthicum, MD (US)

( * ) Notice: Subject to any disclaimer, the term of this patent is extended or adjusted under 35 U.S.C. 154(b) by 964 days.

(21) Appl. No.: 10/768,883

(22) Filed: Feb. 2, 2004

(51) Int. Cl.
*G06F 11/00* (2006.01)
*H04B 17/00* (2006.01)

(52) U.S. Cl. .................. 370/225; 370/236; 370/242; 370/250; 370/406; 398/1; 398/16; 398/17; 398/20; 398/57

(58) Field of Classification Search .......... 370/216–218, 370/225, 228, 229, 235, 236, 236.1, 236.2, 370/238, 241.1, 242–245, 248–251, 400, 370/404, 406, 907; 398/1–6, 8, 9, 10–13, 398/16–20, 35, 56–59
See application file for complete search history.

(56) References Cited

U.S. PATENT DOCUMENTS

| | | | | |
|---|---|---|---|---|
| 6,026,077 A | * | 2/2000 | Iwata | 370/254 |
| 6,097,696 A | * | 8/2000 | Doverspike | 370/216 |
| 6,278,689 B1 | * | 8/2001 | Afferton et al. | 370/223 |
| 6,714,518 B1 | * | 3/2004 | Weis | 370/248 |
| 7,027,388 B2 | * | 4/2006 | Wen et al. | 370/216 |
| 7,035,203 B2 | * | 4/2006 | Licata et al. | 370/216 |
| 7,330,425 B1 | * | 2/2008 | Gulati et al. | 370/225 |
| 2002/0071392 A1 | * | 6/2002 | Grover et al. | 370/241 |
| 2003/0067648 A1 | * | 4/2003 | Antosik et al. | 359/124 |
| 2003/0107987 A1 | * | 6/2003 | Kinstler | 370/228 |
| 2003/0147352 A1 | * | 8/2003 | Ishibashi et al. | 370/248 |
| 2003/0229807 A1 | * | 12/2003 | Qiao et al. | 713/200 |
| 2004/0190444 A1 | * | 9/2004 | Trudel et al. | 370/224 |
| 2004/0213149 A1 | * | 10/2004 | Mascolo | 370/229 |

* cited by examiner

*Primary Examiner*—Chi Pham
*Assistant Examiner*—Ahmed Elallam
(74) *Attorney, Agent, or Firm*—Clements Bernard Miller; Christopher L. Bernard; Tyler S. Brown

(57) ABSTRACT

An embodiment of the invention provides a method and apparatus for restoring a connection in a network. The connection is typically a sub network connection (SNC). In an embodiment, a failed line in a link connecting a first node and a second node is detected, where the failed line is associated with a sub network connection (SNC). The sub network connection (SNC) is then mapped to an alternate line in the link. The first node will change cross connections in a switch fabric in the first node, while the second node will change cross connections in a switch fabric in the second node, so that both nodes can transmit data on the selected alternate line, in order to restore the SNC.

35 Claims, 5 Drawing Sheets

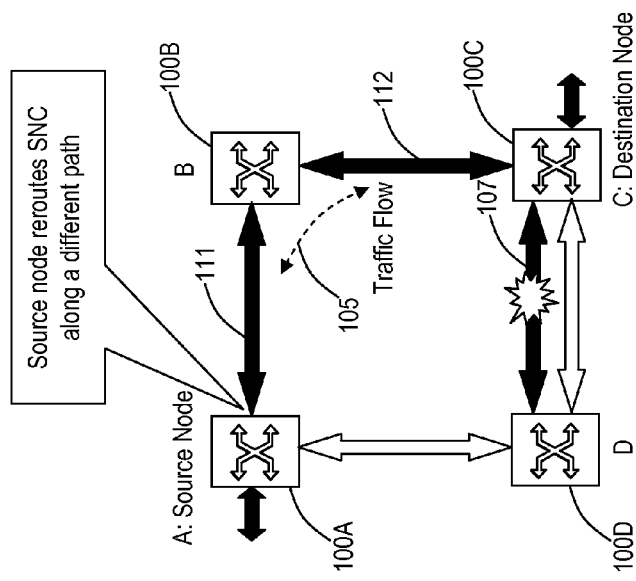
*FIG. 1A.*
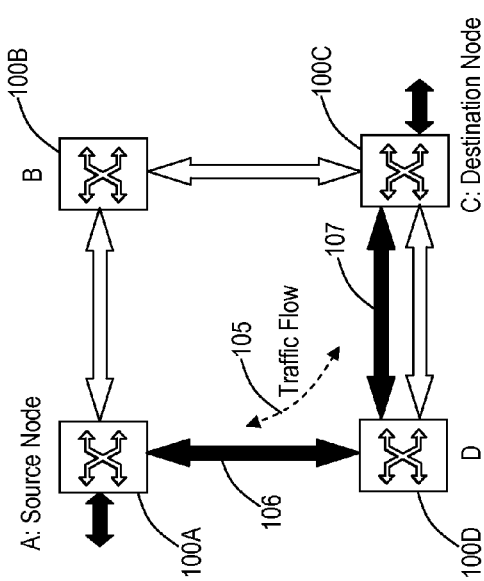
*FIG. 1B.*
*FIG. 1. Prior Art*

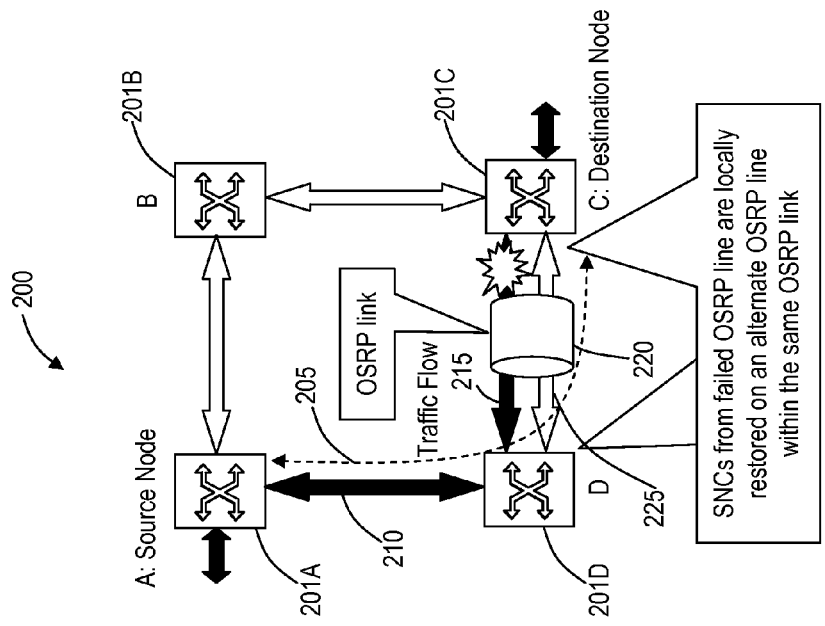
*FIG. 2B.*
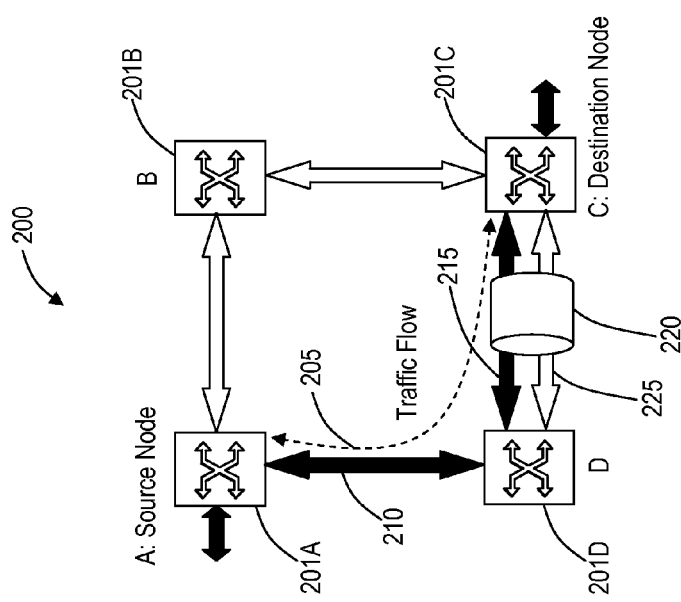
*FIG. 2A.*
*FIG. 2.*

LOCAL SPAN MESH RESTORATION (LSMR)

TECHNICAL FIELD

Embodiments of the invention relate generally to communication networks, and more particularly to an apparatus and method for performing Local Span Mesh restoration (LSMR).

BACKGROUND

A typical network includes multiple nodes that communicate with one another over a path through the network. The path often extends over multiple nodes, and includes at least one optical connection for connecting two adjacent nodes. A node that originates information, or a source node, can compute the path and set up appropriate optical connections using a known Optical Signal and Routing Protocol (OSRP), and information can be exchanged between nodes in accordance with a Synchronous Optical Network (SONET) protocol. SONET is the ANSI (American National Standards Institute) standard for transmitting information over optical fiber. The optical connection may be a Sub Network Connection (SNC), which is a collection of one or more SONET paths or SDH (Synchronous Digital Hierarchy) paths. The SONET standard is used in the United States and Canada and is a variation of the SDH standard. SDH is the ITU-TSS (International Telecommunications Union—Telecommunications Standards Sector) international standard transmitting information over optical fiber. More particularly, an SNC is a connection from a node in a separately identifiable part of a larger network to another node in the networks and typically spans multiple nodes and links. As part of an SNC creation, switching paths are created along the nodes that are traverse by SNC, thus enabling data to flow from the originating node to the destination node. In other words, an optical network can be partitioned into a set of optical sub-networks interconnected by optical links, and the SNC is a connection across an optical sub-network.

FIGS. 1A and 1B illustrate the "Mesh Restoration" method which is a conventional method for performing SNC recovery in response to a failure on an SNC because of an OSRP line failure. Assume that prior to an SNC failure, the traffic flow 105 is along a path formed between source node 100A, intermediate node 100D, destination node 100C, and lines 106 and 107. There will be a failure on the SNC when an OSRP line fails. For example, in FIG. 1, assume that the OSRP line 107 between nodes 100D and 100C fails. If there is a failure on the SNC because of an OSRP line failure, then a signaling message is sent to the source node 100A so that the failed SNC is released to the source node 100A. Releasing an SNC results in all switching paths to be torn down along all the nodes and links that are traversed by the SNC. This results in the immediate stoppage of the flow of data along the released SNC. The source node 100A then calculates an alternate path, sets up the SNC for the alternate path, and signals the rerouted SNC information to the destination node 100C. In the example of FIG. 1a the traffic flow 105 is now along a path formed by node 10A, node 100B, node 100C, and lines 111 and 112, after Mesh Restoration is performed.

The conventional Mesh Restoration method has a restoration time that is highly dependent on the number of hops (distance between intermediate network points) that are traversed by the SNC. The SNC restoration time disadvantageously increases as the average number of nodes in the path of the failed SNC increases. For example, if there is a high number of hops (e.g., 3 hops or greater) that are traversed by the SNC from the source node to the destination node, then the amount of time to perform the SNC recovery and the reset of the line connections will be longer, since the SNC release and new SNC setup will involve the source node. Therefore, the Mesh Restoration method can have performance disadvantages.

The Mesh Restoration method also involves the following activities: (1) transmission of signaling messages to the source node and to the destination node via the alternate path, (2) transmission of routing messages to update the state of the network during and after SNC restoration; and (3) transmission of node management events from the nodes on the network paths (affected by the SNC restoration) to management stations, in order to provide the status of the SNCs. These various activities limit the scalability of the nodes. Furthermore, the scalability of management stations is dependent on the number of generated events, and a high number of generated events can limit the scalability of the management stations.

Therefore, the current technology is limited in its capabilities and suffers from at least the above constraints and deficiencies.

SUMMARY OF EMBODIMENTS OF THE INVENTION

An embodiment of the invention provides a method and apparatus for restoring a connection in a network. The connection is typically a sub network connection (SNC). In an embodiment, a failed line in a link connecting a first node and a second node is detected, where the failed line is associated with a sub network connection (SNC). The sub network connection (SNC) is then mapped to an alternate line in the link. The first node will change cross connections in a stitch fabric in the first node, while the second node will change cross connections in a switch fabric in the second node, so that both nodes can transmit data on the alternate line, in order to restore the SNC. As known to those skilled in the art, a switch fabric is the combination of hardware and software that can move data coming into a network node on a port to the next node via the correct output port when switching paths are configured. A switch fabric includes the switching units in a node, the integrated circuits that are in the switching units, and the programming software or firmware that allows switching paths to be controlled. The switch fabric typically includes data buffers and the use of a shared memory. As known to those skilled in the art, cross connections are the switching paths that are established in a switch fabric to enable data flow through a node.

These and other features of an embodiment of the present invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIGS. 1A and 1B are block diagrams illustrating a conventional Mesh Restoration method.

FIGS. 2A and 2B are block diagrams illustrating a Local Span Mesh Restoration (LSMR) method, in accordance with an embodiment of the invention.

DETAILED DESCRIPTION

Figure 3:
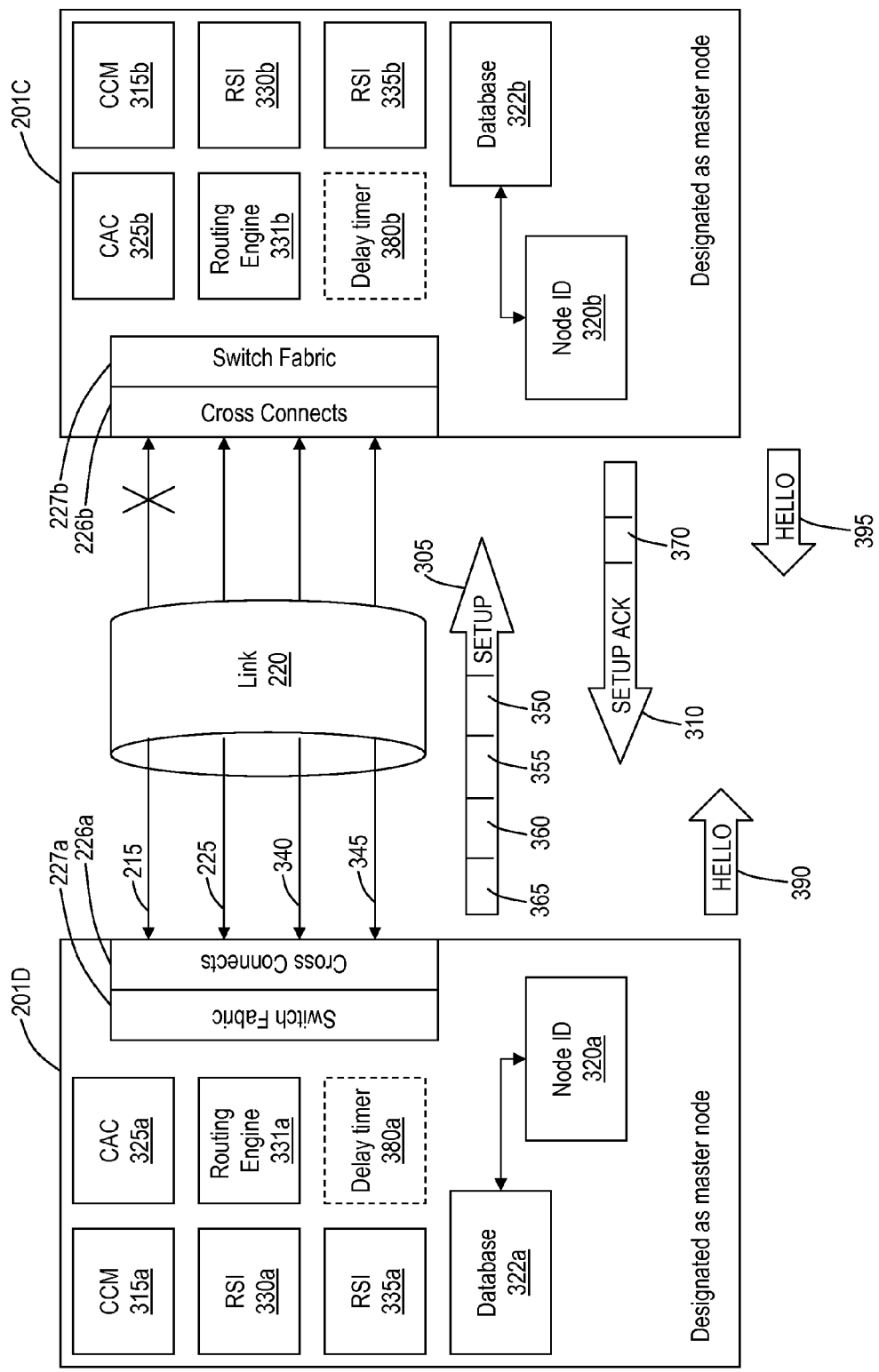
FIG. 3 is a block diagram illustrating an example of the LSMR method, in accordance with an embodiment of the invention.

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

An embodiment of the invention provides a Local Span Mesh Restoration (LSMR) method which is a form of recovery method where an OSRP line (adjacent to or connected to nodes) is subject to a failure, and where an SNC fails due to the failure of the OSRP line. The LSMR method finds an alternate OSRP line between the nodes. The alternate OSRP line is in the same link as the failed OSRP line. In the description herein, a link is defined as a logical connection between two nodes, where a link contains one or more lines. Lines represent unprotected or protected SONET optical fibers or SDH optical fibers. Therefore, a link is a group of one or more optical fibers, where each optical fiber could be of any capacity such as, for example, OC-3 (Optical Carrier 3), OC-12, OC-48 or OC-192. As known to those skilled in the art, OC-n is a SONET rate of n times 51.84 megabits per second (or n STS-1 frames), where n is typically equal to 1, 3, 12, 48, 192, or 768. STS-n (synchronous transport signal level-n) is the various sizes in the SONET hierarchy for an SNC, where n is typically equal to 1, 3, 12, 48, 192 or 768. STS-1 is the SONET standard for transmission over OC-1 optical fiber at a line rate of 51.84 Mbps. STS-n is the SONET standard for transmission over OC-1 optical fiber at a line rate of n×STS-1=n×(51.84 Mbps), where n is typically equal to 1, 3, 12, 48, 192, or 768.

It is also noted that in the drawings and description herein, the lines are sometimes referred to as OSRP lines that are established based upon the OSRP protocol and the links are sometimes referred to as OSRP links that have the OSRP lines. However, the lines and links are not necessarily limited based upon the OSRP protocol, and may be established based upon other suitable signaling and routing protocols.

The LSMR method will restore the SNC to the selected alternate OSRP line. The LSMR recovery method obviates the need for the source node to attempt the recovery of the failed OSRP line. The LSMR recovery method is also typically significantly faster in performance than the conventional Mesh Restoration method, and is independent of the number of hops that is traversed by the SNC.

FIGS. 2A and 2B are block diagrams illustrating an apparatus (or system) 200, in accordance with an embodiment of the invention. The apparatus 200 is typically a portion of a communication network and includes nodes 201A, 201B, 201C, and 201D. Each node (generally referred to as node 201) is a network element and may support various services such as sub-network connections (SNCs). For example, at least one of the nodes 201 may have the functionality of a switch, such as, for example, a CIENA CoreDirector™ switch which is commercially available from CIENA CORPORATION. Of course, each of the nodes 201 may be other suitable network elements. The logical connection between the nodes 201 is commonly known as a link.

The various elements of a node 201 are illustrated in FIG. 3. It is understood that each of the nodes 201 includes known elements or modules that may typically be used to perform switching and/or routing functions in the system 200. As discussed below, in an embodiment of the invention, each of the nodes 201 also includes elements for performing a Local Span Mesh Restoration (LSMR) method for restoring an SNC due to a line failure.

Typically, LSMR requires the link aggregation feature, where multiple OSRP lines are aggregated into one OSRP link. The OSRP link is advertised throughout the network when particular functions are performed. The link aggregation feature is disclosed in, for example, commonly-assigned U.S. patent application Ser. No. 10/061,995, entitled "LINK AGGREGATION", which is hereby fully incorporated herein by reference.

In FIG. 2A, assume that a traffic flow 205 of signal is between source node 201A and destination node 201C via line 210 and line 215 (in link 220). In the example of FIG. 2A, a link 220 includes both line 215 and line 225. The number of lines in a link may vary in number. It is noted that in the drawings and description herein, the lines are sometimes described as OSRP lines that are established based upon the OSRP protocol and the links are sometimes described as OSRP links that have the OSRP lines. However, the lines and links are not necessarily limited based upon the OSRP protocol, and may be established based upon other suitable signaling and routing protocols.

For further background information, some of the routing and signal functions of OSRP are disclosed in commonly owned and co-pending U.S. patent application Ser. No. 09/259,263, filed Mar. 1, 1999, entitled "ROUTING AND SIGNALING IN A SONET NETWORK" (U.S. Pat. No. 7,009,934—Mar. 7, 2006), which is hereby fully incorporated herein by reference, and Ser. No. 09/493,344, filed Jan. 28, 2000, entitled "SYSTEM AND METHOD FOR CALCULATING PROTECTION ROUTES IN A NETWORK PRIOR TO FAILURE" (U.S. Pat. No. 6,859,431—Feb. 22, 2005), which is hereby fully incorporated herein by reference. The routing protocol in OSRP is responsible for various functions such as discovery of neighbors and link status, reliable distribution of routing topology information, and optimal route determination. The signaling protocol provides various capabilities such as the capability of establishing, tearing down, and modifying connections across a network of nodes (network elements).

In FIG. 2B, assume that an SNC in the network fails due to, for example, a line failure such as the failure of line 215. In an embodiment of the invention, the failed SNC is restored in accordance with the following method. It is noted that an embodiment of the invention can also restore multiple SNCs that fail due to a line failure or multiple line failures. The failed SNC is locally restored on an alternate line within the same link 220 that contains the failed line 215. In the example of FIG. 2B, the failed SNC is locally restored on the alternate line 225 in the link 220. The traffic flow 205 will still transmit between source node 201A and destination node 201C via line 210 and link 220. In contrast, in the conventional Mesh Restoration method, the source node 100A will calculate an alternate path in order to restore the SNC. For example, in the Mesh Restoration method, the traffic flow might be changed to flow between source node 201A, node 201B, destination node 201C, and lines 230 and 235.

In an embodiment of the invention, the source node 201A calculates the links that are traversed by an SNC (i.e., OSRP links that are in the SNC path), instead of calculating the lines that are traversed by the SNC. The ingress node of the link 220 selects the line within the link 220 that is traversed by the SNC. The ingress node is the node through which a packet enters, prior to transmission of the packet across the link 220. During the LSMR procedure, a master node (e.g., node 201D in the example of FIG. 3) selects an alternate line within the same link 220 that contains a failed line and that is traversed by an SNC. The failed SNC is mapped and restored on the selected alternate line. The selected alternate line is identified n a setup message 305 (FIG. 3) that is transmitted from the master node (e.g., node 201D) to a slave node (e.g., node 201C). The slave node can then identify the selected alternate line by examining the setup message 305.

When a link comes up between two nodes (generally, nodes 201), the OSRP protocol is used to determine a master-slave relationship between the two nodes 201 on the ends of the link 220. In an embodiment of the invention, by convention, the node 201 with a higher node identifier value is designated as the "master node" and the node 201 opposite to the master node in the link 220 (and having the lower node identifier value) is designated as the "slave node". Of course, other alternate conventions may be used, such as, for example, designating the node 201 with the lower value as the master node.

In an embodiment of the invention, the two nodes 210 can first determine if each of the nodes 201 are capable of performing the LSMR method by first performing a hello procedure, before proceeding with the LSMR method in order to restore an SNC due to a line failure in the link 220. A routing engine 331a (FIG. 3) in the master node 201D can send a "hello" message 390 to the routing engine 331b in the slave node 201C, and the routing engine 331b in slave node 201C can reply with a "hello" message 395 that indicates if the slave node 201C is capable of performing the LSMR procedure as discussed herein. The routing engine 331a sends a hello message 390 on a link by link basis. Additionally or alternatively, if the slave node 201C does not reply with a hello message 395 or replies with an indication that the slave node is incapable of LSMR, then the master node 201D will assume that the slave node 201C is not capable of performing the LSMR procedure. It is noted that the slave node 201C can also send the hello message 395 to the master node 201D, and the master node 201D may reply with a hello message 390.

A flag 420a (see FIG. 4) in the database 322a (see FIG. 3) of node 201D indicates if the node 201D is capable to perform LSMR. The flag 420a is in the node configuration information 415a (FIG. 4) in the node 201D. When the node 201D sends the hello message 390 to the node 201C and receives the hello message 395 from the node 201C, the node 201D can determine from the hello message 395 if the node 201C is capable to perform LSMR. A flag 420b (see FIG. 4) in the database 322b (see FIG. 3) of node 201C indicates if the node 201C is capable to perform LSMR. The flag 420b is in the node configuration information 415b (FIG. 4) in the node 201C. The node 201D learns the node configuration information 415b during this hello procedure.

If the node 201C is not capable to perform LSMR, then the LSMR procedure is not performed. On the other hand, if the node 201C is capable to perform the LSMR, then this hello procedure determines if each line in the link 220 is capable to perform LSMR. The hello messages 390 will indicate if each line 215, 225, 340, 345 (FIG. 3) is capable to perform LSMR on the node 201D side. The flags 445a, 445b, 445c, and 445d (FIG. 4) indicate if the lines 215, 225, 340, and 345, respectively, have been set to perform LSMR on the node 201D side.

The flags 445a, 445b, 445c, and 445d are in the local line configuration information 405a (FIG. 4) in the database 322a (FIG. 3) in node 201D.

The hello messages 395 will indicate if each line 215, 225, 340, 345 (FIG. 3) is capable to perform LSMR on the node 201C side. The flags 406b, 407b, 408b, and 409b (FIG. 4) indicate if the lines 215, 225, 340, and 345, respectively, have been set to perform LSMR on the node 210C side. The flags 446a, 446b, 446c, and 446d are in the remote line configuration information 406b-409b, respectively, (FIG. 4) in the database 322b (FIG. 3) in node 201C. The node 201D learns the remote line configuration information 405b during this hello procedure. If a line is capable to perform LSMR both from the node 201D side and from the node 201C side, then the line is considered as capable to perform LSMR.

If both the master node 201D, the slave node 201C, and at least one potential alternate line (i.e., a line other than the failed lines in the link 220) can perform the LSMR procedure, then LSMR of a failed SNC is performed in accordance with embodiments of the invention as discussed herein.

Figure 4:
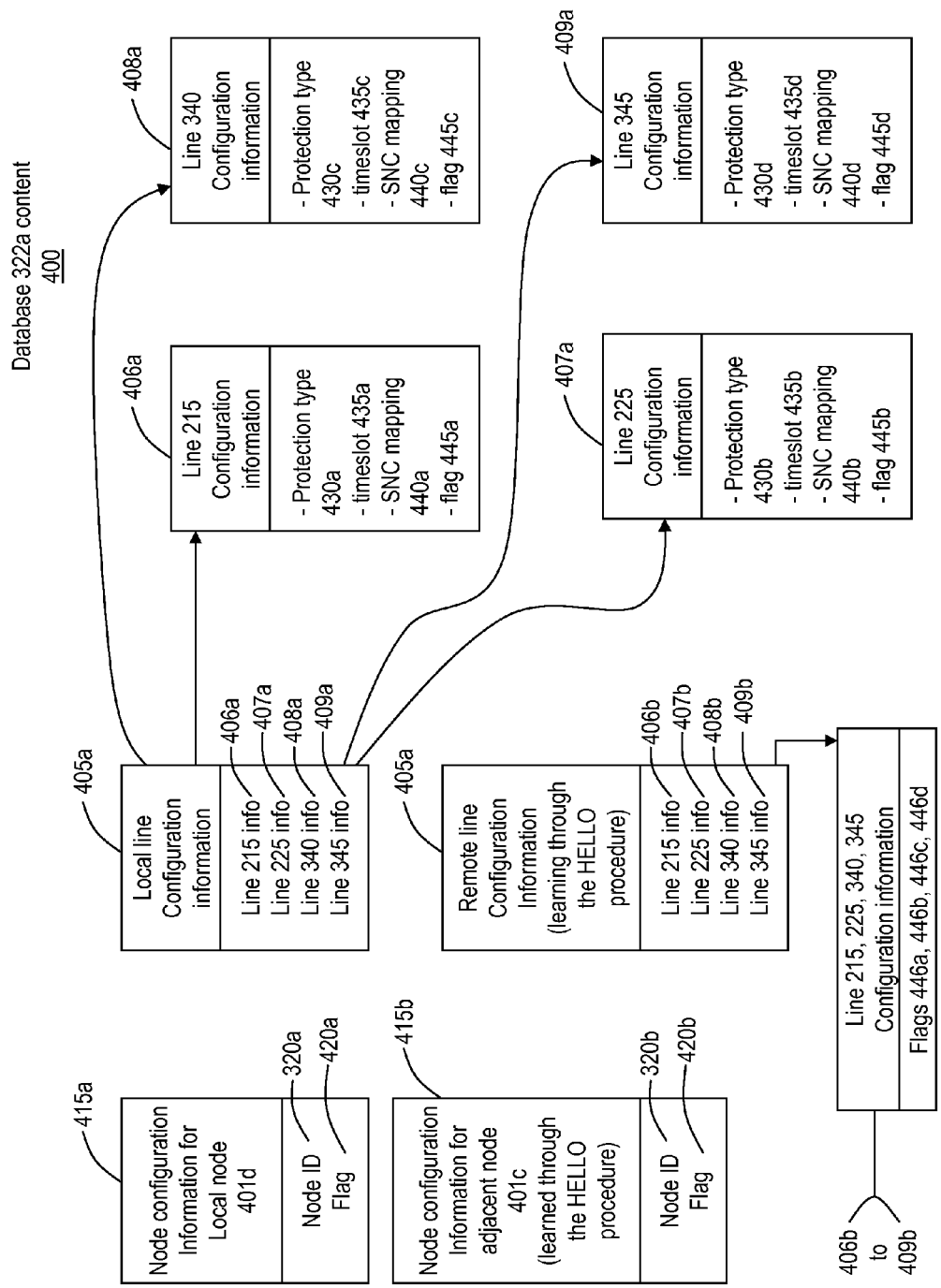
FIG. 4 is a block diagram illustrating the configuration information in a database that can be used in a node, in accordance with an embodiment of the invention.

The various configuration information in FIG. 4 may include other known configuration data for nodes, links, and lines and/or other network elements. These known configuration data are not shown in FIG. 4 for purposes on focusing on the features of embodiments of the invention.

If the above hello procedure is not implemented in an embodiment of the invention, then each of the nodes 201D and 201C are pre-configured with LSMR information for both local and remote nodes (i.e., nodes 201D and 201C, respectively) and lines to enable LSMR on the link 220. The LSMR information permits LSMR to be performed on the link 220 in accordance with the methods described herein and includes the various configuration information in FIG. 4.

In the example of FIG. 2B, assume that node 201D is designated as the master node and that node 201C is designated as the slave node. When a line failure occurs within a link (e.g., link 220), the nodes on the ends of the link will detect the line failure. If a line 215 fails on an active SNC, the master node 201D will attempt to find an alternate line 225 within the same link 220 (that has the failed line 215) for each affected active SNC. The LSMR method finds an alternate line within one hop (within the link between the two nodes).

An LSMR Setup message 305 (see FIG. 3) is sent by the master node 201D to the slave node 201C, after the master node 201D has selected the alternate line 225 for restoring the SNC affected by the failed line 215. It is noted that the LSMR Setup message 305 can be designated with another suitable identifier name such as, for example, "setup message" 305 or other identifier names.

In an embodiment of the invention, typically, the LSMR Setup message 305 has a format that is based upon the OSRP protocol and has additional information (e.g., information 350, 355, 360, and 365 in FIG. 3) that are provided to the slave node 201C by the master node 201D. The LSMR Setup message 305 can be associated with a single SNC (e.g., a SONET STS-1 SNC) or can be associated with multiple SNCs (e.g., 4 SONET STS-1 SNCs). As mentioned above, an STS-1 SNC is an SNC with a size of STS-1 (i.e., line rate of 51.84 Mbps). After the master node 201D has sent the LSMR Setup message 305, the master node 201D deletes the previous cross connections in the switch fabric (switch fabric circuit) 227a, and creates cross connections (cross connection configurations) 226a in the switch fabric 227a, so that the master node 201D can transmit data on the selected alternate line 225. In other words, at the master node (first node) 201D, the cross connection configuration in the switch fabric circuit 227a is changed to obtain a new cross connection 226a configuration, in order to permit the master node 201D to transmit data on the alternate line, after the setup message 305 is transmitted by the master node 201D. As mentioned above, a switch fabric 227 typically includes the switching units in a node, the integrated circuits that are in the switching units, the programming software or firmware that allows switching paths to be controlled, and data buffers and/or shared memory.

The slave node 201C waits for receipt of the LSMR setup message 305. The slave node 201C deletes the previous cross connections in the switch fabric (switch fabric circuit) 227b and creates cross connections (cross connection configurations) 226b in the switch fabric 227b, in order to permit the slave node 201C to transmit data on the selected alternate line 225, after receiving the LSMR setup message 305 from the master node 201D. In other words, at the slave node (second node) 201C, the cross connection configuration in the switch fabric circuit 227b is changed to obtain a new cross connection 226b configuration, in order to permit the slave node 201C to transmit data on the alternate line, after the setup message 305 is received by the slave node 201C.

Once the cross connections 226 are created on both the master node 201D and the slave node 201C, the data path of the SNC becomes operational.

Note that the slave node 201C will send back an LSMR Setup Acknowledgement message 310 (see FIG. 3) to the master node 201D, if the slave node 201C receives the LSMR Setup message 305. The LSMR method is then complete after the master slave 201D processes the LSMR Setup Acknowledgement message 310 from the slave node 201C, as discussed below in additional details. It is noted that the LSMR Setup Acknowledgement message 310 can be designated with another suitable identifier name such as, for example, "setup acknowledgment message" or other identifier names. Typically, the LSMR Setup Acknowledgement message 310 has a format that is based upon the OSRP protocol and has additional information (e.g., information 370 in FIG. 3) that is provided to the master node 201D by the slave node 201C. It is further noted that for each LSMR call (setup message) 305, there is an associated cause code (success/failure) in the LSMR Setup Acknowledgment message 310, where the cause code indicates if the slave node 201C had successfully or unsuccessfully created cross connections 226b in the switch fabric 227b in the slave node 201C. There is one LSMR Setup Acknowledgement message 310 that is sent back from slave node 201C to the master node 201D, for all SNCs that are in (i.e., associated with) the LSMR Setup message 305. The LSMR Acknowledgment message 310 will include all of the associated cause codes of these SNCs.

In an embodiment of the invention, the LSMR method typically uses only two messages (i.e., setup message 305 and setup acknowledgement message 310 in FIG. 3), thus leading to a significant reduction in the number of messages during the restoration of the SNC. Also, the LSMR method is independent of the number of nodes in the SNC restoration path, because an SNC from a failed line is locally restored on an alternate line within the same link. By selecting an alternate line within the same link, the SNC connection is typically only torn down and restored across one hop distance between two nodes, and it is not necessary to tear down and restore the SNC connection from end-to-end (i.e., from the source node to the slave node). As a result, this local line restoration technique of the LSMR method improves the network performance due to the reduced time for performing the SNC restoration.

Additionally, only the two nodes at the affected link are required to send the node management events to the management stations. The management stations are typically in network elements that are separate from the nodes in the communication network. Therefore, the LSMR method reduces the number of generated node management events during the restoration of an SNC, and this reduced number of events improves the scalability for the network.

In an embodiment of the invention, the SNCs that cannot be mapped to an alternate line will be released to the source node, in order to perform the conventional Mesh Restoration method on these unmapped SNCs. As mentioned above, when an SNC is released, there is an immediate stoppage of the flow of data along the released SNC. Also, the selected alternate line during the SNC restoration should have the same SONET protection type as the failed line. Additionally, not all of the SNCs need to be mapped to the same alternate line. However, a single SNC is typically not split across multiple lines.

FIG. 3 is a block diagram illustrating an example of the LSMR method as performed in the system 200, in accordance with an embodiment of the invention. The LSMR method advantageously provides a performance enhancement feature for a network.

A node 201 includes a CCM module (call control module) 315 which is a module used in the OSRP protocol. In the example of FIG. 3, the CCM module 315 is shown as CCM module 315a in node 201D and as CCM module 315b in node 201C. The CCM modules 315 read and identify the node ID values 320a and 320b of the node 201D, and node 201C, respectively. The node ID value 320 is typically stored in a memory area of a node 201. For example, the node ID value 320a of node 201D is stored in a database 322a, while the node ID value 320b of node 201C is stored in a database 322b. The CCM module 315 can examine the node configuration information 415a and 415b (see FIG. 4) to determine which node 201 has a higher node ID value 320. As noted above, the node 201D learns the node configuration information 415b of node 201C by the above-discussed hello procedure. Similarly, the node 201C learns the node configuration information 415a of node 201D by the hello procedure. As mentioned above, in one embodiment of the invention, the node with the higher node ID value 320 is designated by the CCM modules 315 as a master node and the node with the lower ID value 320 is designated by the CCM modules 315 as the slave node. In the example of FIG. 3, assume that node 201D has a node ID value 320a equal to 200 and that the node 201C has a node ID value 320b equal to 100. Therefore, the CCM modules 315 in both nodes 201D and 201C will designate the node 201D as the master node and the node 201C as the slave node.

In an embodiment of the invention, after the master node 201D detects a down (failed) line (failed line 215 in this example), then the master node 201D will perform the acts as described below in order to restore the failed SNCs.

A CCM (Call Control Module) module 315a (in master node 201D) identifies the line that has failed and also determines if an alternate line is still operational. The CCM module 315a (in master node 201D) identifies each SNC that needs to be restored due to the line failure between the master node 201D and the slave node 201C. An RSI (Routing and Signaling Information) module 330a (in master node 201D) reads the local configuration information in each alternate line (lines 225, 340, and 345 in this example) and remote information from the above mentioned hello procedure and performs mapping of each of the failed SNC (or SNCs) to the proper alternate line in the same link 220 that has the failed line 215. The line configuration information 406a, 407a, 408a, and 409a (FIG. 4) indicate the configuration information for lines 215, 225, 340, and 345, respectively, from the node 201D side. Similarly, line configuration information 406b, 407b, 408b, and 409b (FIG. 4) indicate the configuration information for lines 215, 225, 340, and 345, respectively, from the node 201C side. The RSI module 330a will map each failed SNC to a proper alternate line. A failed SNC is not mapped to the lines that are not in the same link as the failed line. In order to perform the LSMR method, the above-mentioned link aggregation feature is used to aggregate the multiple lines into the same link.

In an embodiment of the invention, during the mapping of the failed SNCs to the alternate lines, the RSI module 330a will only select alternate lines with the same SONET protection type as the SONET protection type of the failed line 215. The protection type is indicated in the line configuration information 406a-409a for lines 215, 225, 340, and 345, respectively. As shown in FIG. 4, the lines 215, 225, 340, and 345, have protection type identifiers 430a, 430b, 430c, and 430d, respectively, to indicate the protection type of each line. For example, if the failed line 215 is an unprotected line, then only alternate lines (in the same link 220) that are unprotected lines will be eligible for selection as alternate lines. If the failed line 215 is a protected line, then only alternate lines (in the same link 220) that are protected lines will be eligible for selection as alternate lines. In the example of FIG. 3, the failed SNC can be mapped to the alternate line 225 because alternate line 225 and the failed line 215 both have the same SONET protection type and are both within the same link 220.

In an embodiment of the invention, during the mapping of the failed SNCs to the alternate lines, the RSI module 330a will give preference to the higher priority SNCs over the lower priority SNCs. In other words, the higher priority SNCs are mapped to the alternate lines before the lower priority SNCs are mapped to the alternate lines. In the example where there is limited bandwidth within the alternate lines to locally restore all SNCs, the higher priority SNCs are first restored (i.e., mapped to the alternate lines). If there is available bandwidth remaining in the remaining available alternate lines, then the lower priority SNCs are restored on the remaining available alternate lines.

In an embodiment of the invention, the number of SNCs that are mapped to a selected alternate line are maximized in order to improve the network performance. Network performance is improved by decreasing the number of messages during the SNC restoration process. For example, assume that the selected alternate line 225 (for mapping an SNC) has a bandwidth of STS-12c (synchronous transport signal level-12). Note that STS-nc (Synchronous Transport Signal "n" concatenated) is the SONET standards for transmission over OC-n optical fiber by multiplexing "n" STS-1 frames, (e.g., STS-3 at 155.52 Mbps; STS-12 at 622.08 Mbps; and STS-48 at 2.488 Gbps, but treating the information fields as a single concatenated payload, where a concatenated payload is a plurality of fields that are linked in series). Assume further in this example that five SNCs (i.e., one STS-12c SNC and four STS-3c SNCs) are candidates for mapping/restoration to the selected alternate line 225. The RSI module 330a will map/restore the four STS-3c SNCs, instead of the STS-12c, to the selected alternate line 225, in order to maximize the number of SNCs that are mapped to the selected alternate line 225.

For the SNCs that have been mapped to the alternate lines, the CAC module 325a obtains the timeslots on the selected alternate lines. Timeslots are the discrete quanta of bandwidth on a line. Switching paths are established in a switch fabric by connecting one or more timeslots on the ingress port of a node to one or more timeslots on the egress port of the node. Typically, the timeslots obtained on the selected alternate lines do not have to match of the original timeslots on the failed lines. In the example of FIG. 3, the timeslot of the selected alternate line 225 does not have to match the original timeslot of failed line 215. As shown in FIG. 4, the lines 215, 225, 340, and 345, have timeslots indicated in the fields 435a, 435b, 435c, and 435d, respectively.

The CCM module 315a then creates and sends an LSMR Setup message 305 that contains information 350 on the selected alternate line 225 and the timeslot 355 of the selected alternate line 225. It is noted that the RSI module 330a and the CAC module 325 are also involved in the creation and transmission of the LSMR setup message 305. The CAC module 325a provides various information in the LSMR Setup message 305, such as the timeslot information 355 and the failed line information 360. The RSI module 330a provides various information in the LSMR Setup message 305, such as the configuration information 350 of the selected alternate line 225 and information 365 of the failed SNC that has been mapped to the selected alternate line 225.

In an embodiment of the invention, after the LSMR Setup message 305 is transmitted from the master node 201D, the CCM module 315a starts a setup acknowledgement timer period in a timer (LSMR Setup Acknowledgement timer) 335a, and the CAC module 325a deletes the previous cross connections in the switch fabric 227a, and creates the cross connections 226a in the switch fabric 227a, due to the selected alternate line 225. The CCM module 315a and the timer 335a form a setup acknowledgement timer circuit. As noted above, each SNC that has been mapped by the RSI module 330a is identified in the LSMR Setup message 305 and an attempt is made to locally restore each failed SNC by use of a selected alternate line. The CCM module 325a on the master node 201D will release all SNCs that have been mapped to alternate lines where cross connection formation (on cross connections 226a) was not successfully performed.

The CCM module 325a will also release all of the SNCs that could not be mapped to alternate lines by the RSI module 330a in the previously performed mapping step discussed above. By releasing these SNCs, the LSMR process will not attempt to map and restore these released SNCs. The released SNCs can be restored by use of the conventional Mesh Restoration method, where restoration of the SNC is performed throughout the network, as described above.

The CCM module 315a can determine if the LSMR Setup Acknowledgement message 310 is received by the master node 201D from the slave node 201C prior to the expiration of the setup acknowledgement timer period of timer 335a. The LSMR Setup Acknowledgement message 310 indicates that the slave node 201C had received the LSMR Setup message 305 and had successfully established cross connections 226b in the switch fabric 227b, in order to permit the slave node 201C to transmit data on the selected alternate line 225, or the message 310 could indicate that the slave node 201C had failed to establish the cross connections 226b that will permit the slave node 201C to transmit data on the selected alternate line 225.

If the master node 201D does not receive an LSMR Setup Acknowledgement message 310 prior to the expiration of the setup acknowledgement timer period of timer 335a, then the CCM module 315a will release all LSMR calls (SNCs) in the LSMR setup message 305. In this situation, the LSMR procedure is declared or treated as unsuccessfully performed.

When a CCM module 315b (in slave node 201C) detects a line (e.g., line 215) that is down in the link 220, then the slave node 201C performs the following acts as described below. The CCM module 315b in the slave node 201C identifies each SNC that is affected by the failed line.

The CCM module 315b in the slave node 201C start an inactivity timer for an inactivity timer period (LSMR Inactivity timer) 335b, and can determine if an LSMR Setup message 305 is received by the slave node 201C from the master node 201D prior to the expiration of this timer period. The CCM module 315b and inactivity timer 335b form a setup timer circuit. For example, the inactivity timer period is started when the CCM module 325b in the slave node 201C detects a failed line condition in the link 220. In an embodiment of the invention, if an LSMR Setup message 305 is not received by the slave node 201C prior to the expiration of this inactivity timer period, then the CCM module 315b will release all SNCs on the failed line. At this time, the LSMR procedure is declared or treated as unsuccessfully performed.

After receipt of the LSMR Setup message 305 by the slave node 201C from the master node 201D within the inactivity timer period, the slave node 201C performs the following acts as discussed below. The CAC module 305b in the slave node 201C will delete the previous cross connections in the switch fabric 227b for all the SNCs indicated in the LSMR Setup message 305, since the SNC is now mapped to the alternate line 225 and is no longer mapped to the failed line 215. The CAC module 325b identifies the SNCs in the information 365 in LSMR Setup message 305. The CAC module 325b will also create the new cross connections 226b in the switch fabric 227b, in order to permit the slave node 201C to transmit data on the selected alternate line, in order to activate a data path that is formed by the SNC. As discussed above, the selected alternate lines are identified in the LSMR Setup message 305. When the cross connections 226a in the switch fabric 227a on the master node 201D and the cross connections 226b in the switch fabric 227b in the slave node 201C have been created, then data would be up on the SNC (i.e., the SNC service would be available) because the cross connections are now created due to the selected alternate line.

Also, in the above step, the CAC module 325b will release all SNCs that have failed or identified to be down because of the failure event but are not identified in the LSMR Setup message 305. For example, if the master node 201D is not able to map all of the failed SNCs and could only map out a subset of the failed SNCs, then the information 365 in the LSMR Setup message 305 will only indicate the mapped subset of the failed SNCs and will not indicate the unmapped failed SNCs.

The CCM module 315b in the slave node 201C will also cancel the inactivity timer 335b when the slave node 201C receives the LSMR Setup message 305. Also, the slave node 201C will send an LSMR Setup Acknowledgement message 310 to the master node 201D after receiving the LSMR Setup message 305. The LSMR Setup Acknowledgement message 310 will include a success/failure cause code 370 for all the calls of the LSMR Setup message 305. If there is a local failure for any of the SNCs of the LSMR Setup message 305, then the code 370 includes a failure cause code associated with the LSMR call 305, and the failure cause code may identify the cause of the failure. Therefore, if the slave node 201C did not successfully create the cross connections 226b due to the selected alternate line 225, then the failure cause code can indicate information associated with the cross connections 226b that was not successfully created. On the other hand, if the cross connections 226b were successfully created on the slave node 201C, then the code 370 will include a success cause code indicating that the slave node 201C had successfully created the cross connections 226b for to the selected alternate line 225.

Upon receipt of the LSMR Setup Acknowledgement message 310 from the slave node 201C, the master node 201D performs the following acts. The CCM module 315a in the master node 201D cancels the LSMR Setup Acknowledgement timer 335a. The CAC module 325a in the master node 201D will also release all SNCs (in setup message 305) associated with any failure cause code as indicated in the LSMR Setup Acknowledgement message 310 and will release these failed SNCs.

When the setup acknowledgement timer 335a expires and a setup acknowledgement message 310 has not yet been received by the master node 201D, then the master node 201D will release all SNCs associated with the setup message 305. When the inactivity timer 335b expires and a setup message 305 has not yet been received by the slave node 201C, then the slave node 201C will release all SNCs on the failed line.

In another embodiment of the invention, assume that the CAC module 325b (in slave node 201C) does not detect the failed line 215 (line down condition), but the slave node 201C did receive an LSMR Setup message 305 from the master node 201D. In response, the slave node 201C will assume the line 215 as failed and will form the cross connections 226b for the selected alternate line 225 as identified in the LSMR Setup message 305. The slave node 201C can identify the failed line 215 based upon the information 360 of the SNC in the LSMR Setup message 305. The slave node 201C assumes that the source line of the SNC associated with the setup message 305 will be the failed line.

Assume that multiple lines in the link 220 are subject to failure. For example, a bundle failure may cause the failure of multiple lines. In another embodiment of the invention, an optional timer 380a will delay the initiation of the LSMR procedure by a time delay amount (e.g., 20 milliseconds). Note that the slave node 201C also has an optional timer 380b for performing a similar function. The short time delay amount permits all affected lines in the link 220 to fail before the LSMR procedure is initiated. Since all affected lines would have failed before the initiation of the LSMR procedure, the failed SNC connection is not mapped to an alternate line that is subject to failure due to a bundle failure or other types of multiple line failure condition. Therefore, in this embodiment of the invention, the RSI module 330a will not map the SNC to the alternate line until expiration of the time delay amount. For networks that are typically subjected to the single line failure condition, this delay timer 380 is preferably not implemented in the nodes 201 in order to prevent unnecessary time delays in network operation.

In another embodiment of the invention, the customer or user has the option to choose particular line that will not be eligible for the LSMR method. In other words, the customer can designate the particular lines that will not be used as alternate lines, in response to a line failure. The particular lines that are not eligible for the LSMR method can be indicated by a flag value (e.g., flags 445a-445d and 446a-446d) (FIG. 4) in the line configuration information 405 to inform the RSI module 330a that the particular line is not eligible as an alternate line for the LSMR method.

Figure 5:
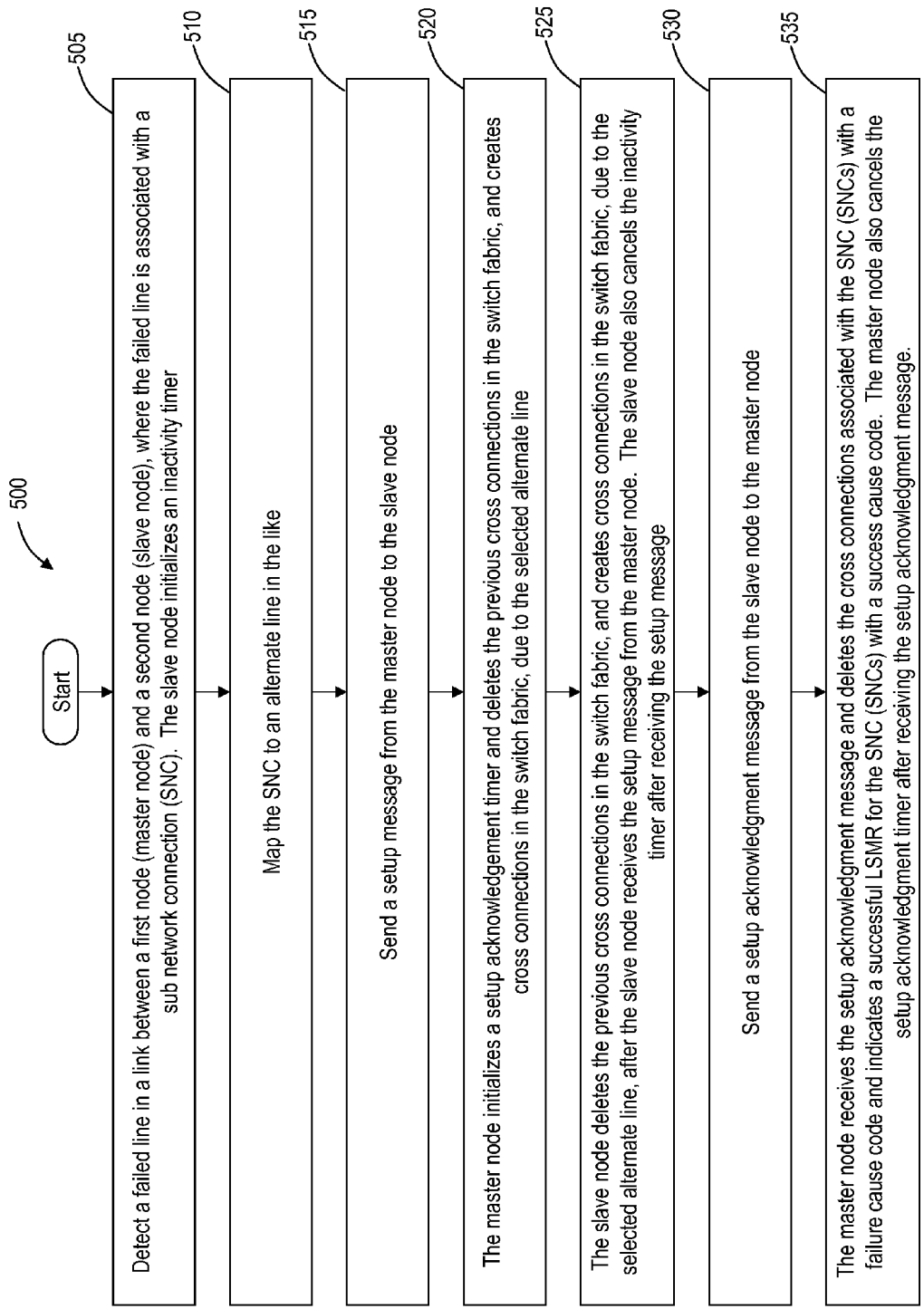
FIG. 5 is a flowchart of a method for LSMR, in accordance with an embodiment of the invention.

FIG. 5 is a flowchart of a method 500 for restoration of a connection in a network, in accordance with an embodiment of the invention. The method 500 is initiated by detecting (505) a failed line in a link between a first node and a second node, where the failed line is associated with a sub network connection (SNC). In step (505), the slave node initializes an inactivity timer 335b (FIG. 3) that was discussed above. The sub network connection (SNC) is mapped (510) to an alternate line in the link.

The first node and the second node are designated as a master node or as a slave node, based upon the node ID value in the node. A setup message (e.g., LSMR Setup message 305) is sent (515) from the master node to the slave node.

In step (520), after the master node (first node) has sent the setup message, the master node initializes a setup acknowledgement timer 335a (FIG. 3) and deletes the previous cross connections in the switch fabric, and creates cross connections in the switch fabric, in order to permit the master node to transmit data on the selected alternate line.

In step (525), the slave node deletes the previous cross connections in the switch fabric, and creates cross connection in the switch fabric, in order to permit the slave node to transmit data on the selected alternate line, after receiving the setup message. The slave node also cancels the inactivity timer after receiving the setup message. Once the cross connections are created on both the master node and the slave node, the data path of the SNC becomes operational. The slave node detects if a setup message is received by the slave node within the inactivity timer period.

The slave node sends (530) a setup acknowledgement message to the master node, after slave node receives the setup message. The setup acknowledgement message includes a cause code 370 (FIG. 3) indicating a successful creation by the slave node of cross connections or a failed attempt by the slave node in creating the cross connections in the switch fabric.

In step (535), if the master node receives the setup acknowledgement message, then the master node deletes the cross connections associated with the SNC (SNCs) with a failure cause code and indicates a successful LSMR for the SNC (SNCs) with a success cause code. In step (535), the master node also cancels the setup acknowledgement timer after receiving the setup acknowledgement message.

In accordance with an embodiment of the invention, various advantages of the LSMR method include increased/improved performance by the network and increased/improved scalability of the network. The LSMR method improves/increases the network performance by making the SNC restoration independent on the number of nodes in the restoration path. For example, a restoration of a five (5) hop SNC can be performed in approximately the same time amount as the restoration of a single hop SNC, since the LSMR method attempts to map the affected active SNC to an alternate line in a link between two nodes. Because only two nodes are affected in the LSMR method, the number of signaling and routing messages and node management events are greatly reduced, leading to increased scalability for the network.

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing teaching.

Further, at least some of the components of this invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

The various engines or modules discussed herein may be, for example, software, commands, data files, programs, code, modules, instructions, hardware, circuits, combinations thereof, or any of the like, and may also include suitable mechanisms.

It will also be appreciated that one or more of the elements depicted in the drawings/figures can also be implemented in a more separated or integrated manner, or even removed or rendered as inoperable in certain cases, as is useful in accordance with a particular application.

It is also within the scope of the present invention to implement a program or code that can be stored in a machine-readable medium to permit a computer to perform any of the methods described above.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or steps will also be considered as being noted, where terminology is foreseen as rendering the ability to separate or combine is unclear.

The description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for restoring a connection in a network, the method comprising the steps of:
   detecting a failed line in a link between a first node and a second node, where the failed line is associated with a sub network connection (SNC);
   mapping the sub network connection (SNC) to an alternate line in the link in order to permit restoration of the SNC;
   sending a setup message from the first node to the second node;
   sending a setup acknowledgment message from the second node to the first node;
   determining if the setup acknowledgment message is received by the first node within a setup acknowledgement timer period established by a setup acknowledgment timer circuit at said first node; and
   releasing all SNCs associated with the setup message if the setup acknowledgment message is not received by the first node within the setup acknowledgement timer period wherein there is a stoppage of a flow of data along the SNCs that are released.

2. The method of claim 1, wherein the failed line and the alternate line are established by use of Optical Signaling & Routing Protocol (OSRP).

3. The method of claim 1, further comprising the step of:
   identifying the SNC based upon the failed line.

4. The method of claim 1, wherein said mapping step is performed based upon a priority of said SNC.

5. The method of claim 4, wherein said SNC is a first SNC, said network comprising a second SNC, said priority of said first SNC is higher than a priority of said second SNC, said method further comprising the step of mapping said second SNC to said alternate line in the link after said step of mapping the first SNC to the alternate line in the link.

6. The method of claim 1, further comprising the step of: obtaining a timeslot on the alternate line after mapping the SNC on the alternate line, where the timeslot is a discrete quanta of bandwidth on a line.

7. The method of claim 1, wherein said first and second nodes include first and second switch fabric circuits, respectively, said first and second switch fabric circuits having first and second cross connection configurations, respectively, said method further comprising:
changing, at the second node, said second cross connection configuration in said second switch fabric circuit to obtain a third cross connection configuration, in order to permit said second node to transmit data on said alternate line, after the setup message is received by said second node.

8. The method of claim 1, wherein the setup acknowledgment message includes a cause code indicating whether a cross connection configuration in a switch fabric circuit in the second node was successfully created or not successfully created.

9. The method of claim 1, wherein said first and second nodes include first and second switch fabric circuits, respectively, said first and second switch fabric circuits having first and second cross connection configurations, respectively, said method further comprising:
changing, at the first node, said first cross connection configuration in said first switch fabric circuit to obtain a fourth cross connection configuration, in order to permit said first node to transmit data on said alternate line, after the setup message is transmitted by said first node.

10. The method of claim 1, wherein the second node includes a setup timer circuit configured to determine if the setup message is received by the second node prior to expiration of an inactivity timer period/said method further comprising the step of:
determining if the setup message is received by the second node within the inactivity timer period, wherein the inactivity timer period is started when the second node detects the failed line.

11. The method of claim 1, further comprising the step of: determining, at the second node, the failed line by detection of the failed line.

12. The method of claim 1, further comprising the step of: determining, at the second node, the failed line based upon information in a setup message.

13. The method of claim 1, further comprising:
delaying the mapping of the SNC to the alternate line by a time delay amount.

14. The method of claim 1, further comprising the step of: releasing an SNC that is not mapped to an alternate line, wherein there is a stoppage of a flow of data along the SNC that is released.

15. The method of claim 1, further comprising:
determining if the first node and the second node are capable of performing a local span mesh restoration (LSMR).

16. The method of claim 15, further comprising:
if the first node and the second node are capable of performing the LSMR, then determining if at least one potential alternate line in the link is capable of performing the LSMR.

17. An apparatus for restoring a connection in a network, the apparatus comprising:
a first node;
a second node coupled by a link to the first node;
wherein the first node is configured to detect a failed line in the link connecting the first node and the second node, where the failed line is associated with a sub network connection (SNC);
wherein the first node is configured to map the sub network connection (SNC) to an alternate line in the link in order to permit restoration of the SNC;
wherein the first node is configured to send a setup message to the second node;
wherein the second node is configured to send a setup acknowledgment message to the first node;
wherein said first node includes a setup acknowledgement timer circuit configured to determine if the setup acknowledgement message is received by the first node within a setup acknowledgement timer period; and
wherein the first node is configured to release all SNCs associated with the setup message if the setup acknowledgment message is not received by the first node within the setup acknowledgement timer period wherein there is a stoppage of a flow of data along the SNCs that are released.

18. The apparatus of claim 17, wherein the first node comprises:
a Connection Admission Control (CAC) module configured to identify a failed line in the link between the first node and the second node;
a Call Control module (CCM) configured to identify an SNC that needs to be restored due to the failed line; and
a Routing and Signaling Information (RSI) module configured to map the SNC to an alternate line in the link in order to permit restoration of the SNC.

19. The apparatus of claim 17, wherein the failed line and the alternate line are established by use of Optical Signaling & Routing Protocol (OSRP).

20. The apparatus of claim 17, wherein the first node is configured to identify the SNC based upon the failed line.

21. The apparatus of claim 17, wherein the first node is configured to map said SNC based upon a priority of said SNC.

22. The apparatus of claim 21, wherein said SNC is a first SNC, said network comprising a second SNC, said priority of said first SNC is higher than a priority of said second SNC, and wherein the first node is configured to map said second SNC to said alternate line in the link after mapping said first SNC to said alternate line in the link.

23. The apparatus of claim 17, wherein the first node is configured to obtain a timeslot on the alternate line after mapping the SNC on the alternate line, where the timeslot is a discrete quanta of bandwidth on a line.

24. The apparatus of claim 17, wherein said first and second nodes include first and second switch fabric circuits, respectively, said first and second switch fabric circuits having first and second cross connection configurations, respectively; and wherein said second node is configured to change said second cross connection configuration in said second switch fabric circuit to obtain a third cross connection configuration, in order to permit said second node to transmit data on said alternate line, after the setup message is received by said second node.

25. The apparatus of claim 17, wherein the setup acknowledgment message includes a cause code indicating if cross connections in a switch fabric in the second node was successfully created or not successfully created by the second node.

26. The apparatus of claim 17, wherein said first and second nodes include first and second switch fabric circuits, respectively, said first and second switch fabric circuits having first and second cross connection configurations, respectively; and wherein said first node is configured to change said first cross connection configuration in said first switch fabric circuit to obtain a fourth cross connection configuration, in order to permit said first node to transmit data on said alternate line, after the setup message is transmitted by said first node.

27. The apparatus of claim 17, wherein the second node includes a setup timer circuit configured to determine if the setup message is received by the second node prior to expiration of an inactivity timer period; and wherein the inactivity timer period is started when the second node detects the failed line.

28. The apparatus of claim 17, wherein the second node is configured to determine the failed line by detection of the failed line.

29. The apparatus of claim 17, wherein the second node is configured to determine the failed line based upon information in a setup message.

30. The apparatus of claim 17, wherein the first node is configured to delay a mapping of the SNC to the alternate line by a time delay amount.

31. The apparatus of claim 17, wherein the first node is configured to release an SNC that is not mapped to an alternate line, wherein there is a stoppage of a flow of data along the SNC that is released.

32. The apparatus of claim 17, wherein the first node is configured to determine if the second node is capable of performing a local span mesh restoration (LSMR).

33. The apparatus of claim 32, wherein the first node is configured to determine if at least one potential alternate line in the link is capable of performing the LSMR, if the first node and the second node are capable of performing the LSMR.

34. An article of manufacture, comprising:
a machine-readable medium having stored thereon computer executable instructions to:
detect a failed line in a link connecting a first node and a second node, where the failed line is associated with a sub network connection (SNC);
map the sub network connection (SNC) to an alternate line in the link in order to permit restoration of the SNC;
send a setup message from the first node to the second node;
send a setup acknowledgment message from the second node to the first node;
determine if the setup acknowledgment message is received by the first node within a setup acknowledgement timer period established by a setup acknowledgment timer circuit at said first node; and
release all SNCs associated with the setup message if the setup acknowledgment message is not received by the first node within the setup acknowledgement timer period wherein there is a stoppage of a flow of data along the SNCs that are released.

35. An apparatus for restoring a connection in a network, the apparatus comprising:
means for detecting a failed line in a link connecting a first node and a second node, where the failed line is associated with a sub network connection (SNC);
means for mapping the sub network connection (SNC) to an alternate line in the link in order to permit restoration of the SNC;
means for sending a setup message from the first node to the second node;
means for sending a setup acknowledgment message from the second node to the first node;
means for determining if the setup acknowledgment message is received by the first node within a setup acknowledgement timer period established by a setup acknowledgment timer circuit at said first node; and
means for releasing all SNCs associated with the setup message if the setup acknowledgment message is not received by the first node within the setup acknowledgement timer period wherein there is a stoppage of a flow of data along the SNCs that are released.

* * * * *